US012686586B2

(12) United States Patent
Fukui et al.

(10) Patent No.: US 12,686,586 B2
(45) Date of Patent: Jul. 21, 2026

(54) POST-PROCESSING DEVICE AND IMAGE FORMING APPARATUS

(71) Applicant: FUJIFILM Business Innovation Corp., Tokyo (JP)

(72) Inventors: Eri Fukui, Kanagawa (JP); Takayuki Fukamachi, Kanagawa (JP); Koji Kawano, Kanagawa (JP); Yuki Mizuno, Kanagawa (JP); Ryota Izumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/429,458

(22) Filed: Feb. 1, 2024

(65) Prior Publication Data

US 2024/0302782 A1 Sep. 12, 2024

(30) Foreign Application Priority Data

| | | |
|---|---|---|
| Mar. 9, 2023 | (JP) .................................. | 2023-036732 |
| Mar. 27, 2023 | (JP) .................................. | 2023-050217 |
| Sep. 13, 2023 | (JP) .................................. | 2023-148272 |
| Sep. 25, 2023 | (JP) .................................. | 2023-160231 |
| Sep. 26, 2023 | (JP) .................................. | 2023-163181 |

(51) Int. Cl.
B65H 29/70 (2006.01)
B65H 29/12 (2006.01)
(Continued)

(52) U.S. Cl.
CPC ........... B65H 45/18 (2013.01); B65H 29/125 (2013.01); B65H 29/70 (2013.01); B65H 31/02 (2013.01);
(Continued)

(58) Field of Classification Search
CPC .. G03G 15/6567; B65H 29/70; B65H 29/125; B65H 45/18; B65H 31/02;
(Continued)

(56) References Cited

U.S. PATENT DOCUMENTS

| | | | | |
|---|---|---|---|---|
| 6,171,225 B1 * | 1/2001 | Nonoyama | ............... | B42C 1/12 |
| | | | | 271/235 |
| 6,702,279 B2 * | 3/2004 | Adachi | .............. | B65H 31/3027 |
| | | | | 271/220 |

(Continued)

FOREIGN PATENT DOCUMENTS

| | | |
|---|---|---|
| JP | H11322163 | 11/1999 |
| JP | 2004277131 | 10/2004 |

(Continued)

*Primary Examiner* — Leslie A Nicholson, III
(74) *Attorney, Agent, or Firm* — JCIPRNET

(57) ABSTRACT

A post-processing device includes: a loading section that has a loading surface directed obliquely upward and in which a recording medium is loaded on the loading surface in a state where one end of the recording medium is directed downward; a supporting section that supports the one end of the recording medium loaded on the loading surface; a transporting mechanism that transports a plurality of recording media transported one by one toward the loading section by shifting and stacking the recording media in a transport direction, and sets an amount of shift of the recording media on the basis of a predetermined condition; and a transporting section that bends each of the plurality of recording media transported from the transporting mechanism by applying a transport force to an upper end of each of the recording media opposite to the one end in a state where the one end is in contact with the supporting section, and separates one by one the recording media and loads the recording media on the loading surface.

10 Claims, 18 Drawing Sheets

(51) Int. Cl.
| | |
|---|---|
| *B65H 31/02* | (2006.01) |
| *B65H 31/26* | (2006.01) |
| *B65H 45/18* | (2006.01) |
| *G03G 15/00* | (2006.01) |
| *H04N 1/00* | (2006.01) |

(52) U.S. Cl.
CPC ......... *B65H 31/26* (2013.01); *G03G 15/6502* (2013.01); *G03G 15/6555* (2013.01); *G03G 15/6567* (2013.01); *H04N 1/00639* (2013.01); *B65H 2301/16* (2013.01); *B65H 2301/36* (2013.01); *B65H 2404/64* (2013.01); *B65H 2408/12* (2013.01); *B65H 2513/40* (2013.01); *B65H 2701/13212* (2013.01); *B65H 2801/03* (2013.01); *B65H 2801/27* (2013.01); *G03G 2215/00067* (2013.01); *G03G 2215/00742* (2013.01); *G03G 2215/00877* (2013.01); *G03G 2215/0487* (2013.01)

(58) Field of Classification Search
CPC ............ B65H 2301/16; B65H 2301/36; B65H 2404/64; B65H 2801/27
USPC ......... 270/32, 37, 58.11, 58.12, 58.17, 58.27
See application file for complete search history.

(56) References Cited

U.S. PATENT DOCUMENTS

| | | | |
|---|---|---|---|
| 7,673,863 | B2 | 3/2010 | Iguchi |
| 7,836,330 | B2 | 11/2010 | Yokota et al. |
| 7,900,905 | B2 * | 3/2011 | Kiriyama ............... B65H 31/36 |
| | | | 270/58.11 |
| 8,033,539 | B2 * | 10/2011 | Takai ..................... B65H 29/22 |
| | | | 270/58.11 |
| 8,226,080 | B2 * | 7/2012 | Morita ................... B65H 31/36 |
| | | | 270/58.12 |
| 8,556,257 | B2 * | 10/2013 | Mizubata ............... B65H 31/02 |
| | | | 271/223 |
| 9,352,603 | B2 | 5/2016 | Gamo |
| 10,807,824 | B2 * | 10/2020 | Furumido ............. B65H 31/02 |
| 11,021,341 | B2 * | 6/2021 | Kishimoto .............. B65H 9/08 |
| 11,208,291 | B2 * | 12/2021 | Terao ................. G03G 15/6541 |
| 11,649,133 | B2 * | 5/2023 | Sato ................... G03G 15/6541 |
| | | | 270/58.17 |
| 11,993,476 | B2 * | 5/2024 | Osada ................ B65H 31/3081 |
| 2008/0150210 | A1 | 6/2008 | Iguchi |

FOREIGN PATENT DOCUMENTS

| | | |
|---|---|---|
| JP | 2004284756 | 10/2004 |
| JP | 2004292163 | 10/2004 |
| JP | 2006225119 | 8/2006 |
| JP | 2008156113 | 7/2008 |
| JP | 2008156114 | 7/2008 |
| JP | 2009126638 | 6/2009 |
| JP | 2009265959 | 11/2009 |
| JP | 2012136337 | 7/2012 |
| JP | 2015030596 | 2/2015 |
| JP | 2015036233 | 2/2015 |
| JP | 6000718 | 10/2016 |
| JP | 2017057038 | 3/2017 |

* cited by examiner

POST-PROCESSING DEVICE AND IMAGE FORMING APPARATUS

CROSS-REFERENCE TO RELATED APPLICATIONS

This application is based on and claims priority under 35 USC 119 from Japanese Patent Application No. 2023-036732 filed Mar. 9, 2023, Japanese Patent Application No. 2023-050217 filed Mar. 27, 2023, Japanese Patent Application No. 2023-160231 filed Sep. 25, 2023, Japanese Patent Application No. 2023-148272 filed Sep. 13, 2023, and Japanese Patent Application No. 2023-163181 filed Sep. 26, 2023.

BACKGROUND

(i) Technical Field

The present invention relates to a post-processing device and an image forming apparatus.

(ii) Related Art

JP6000718B discloses a sheet processing device including: a sheet loading section on which sheets to be processed are loaded; a sheet stacking section on which sheets are stacked in order to make a plurality of sheets to be processed wait while the sheets on the sheet loading section are being processed; an end stopper that abuts one end of a plurality of sheets transported from the sheet stacking section to the sheet loading section in a sheet transport direction; and a control section that performs control of the sheet stacking section for shifting the sheets in the sheet transport direction and stacking the sheets such that one end of a sheet abutted against the end stopper is closer to the end stopper as the sheet is lower in the sheet loading section and the amount of shift of each sheet between one ends thereof abutting against the end stopper is smaller as the sheet is higher in the sheet loading section, in a case where the sheets stacked on the sheet loading section are ejected.

SUMMARY

As the post-processing device, a post-processing device is conceivable, which includes: a loading section that has a loading surface directed obliquely upward and in which a recording medium is loaded on the loading surface in a state where one end of the recording medium is directed downward; a supporting section that supports the one end of the recording medium loaded on the loading surface; a transporting mechanism that transports a plurality of recording media transported one by one toward the loading section by shifting and stacking the recording media in a transport direction; and a transporting section that bends each of the plurality of recording media transported from the transporting mechanism by applying a transport force to an upper end of each of the recording media opposite to the one end in a state where the one end is in contact with the supporting section, and separates one by one the recording media and loads the recording media on the loading surface.

In the post-processing device, in a case where the amount of shift of the recording medium in the transporting mechanism is consistently constant, trouble in separation of the recording medium may occur in the transporting section, and variation in posture of the loaded recording medium may occur.

Aspects of non-limiting embodiments of the present disclosure relate to a post-processing device and an image forming apparatus that suppress variation in posture of the loaded recording medium, as compared with a case where the amount of shift of the recording medium in the transporting mechanism is consistently constant.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a post-processing device including: a loading section that has a loading surface directed obliquely upward and in which a recording medium is loaded on the loading surface in a state where one end of the recording medium is directed downward; a supporting section that supports the one end of the recording medium loaded on the loading surface; a transporting mechanism that transports a plurality of recording media transported one by one toward the loading section by shifting and stacking the recording media in a transport direction, and sets an amount of shift of the recording media on the basis of a predetermined condition; and a transporting section that bends each of the plurality of recording media transported from the transporting mechanism by applying a transport force to an upper end of each of the recording media opposite to the one end in a state where the one end is in contact with the supporting section, and separates one by one the recording media and loads the recording media on the loading surface.

BRIEF DESCRIPTION OF THE DRAWINGS

Exemplary embodiment(s) of the present invention will be described in detail based on the following figures, wherein.

DETAILED DESCRIPTION

An example of an exemplary embodiment of the present invention will be described below with reference to the drawings.

Image Forming Apparatus 100

Figure 1:
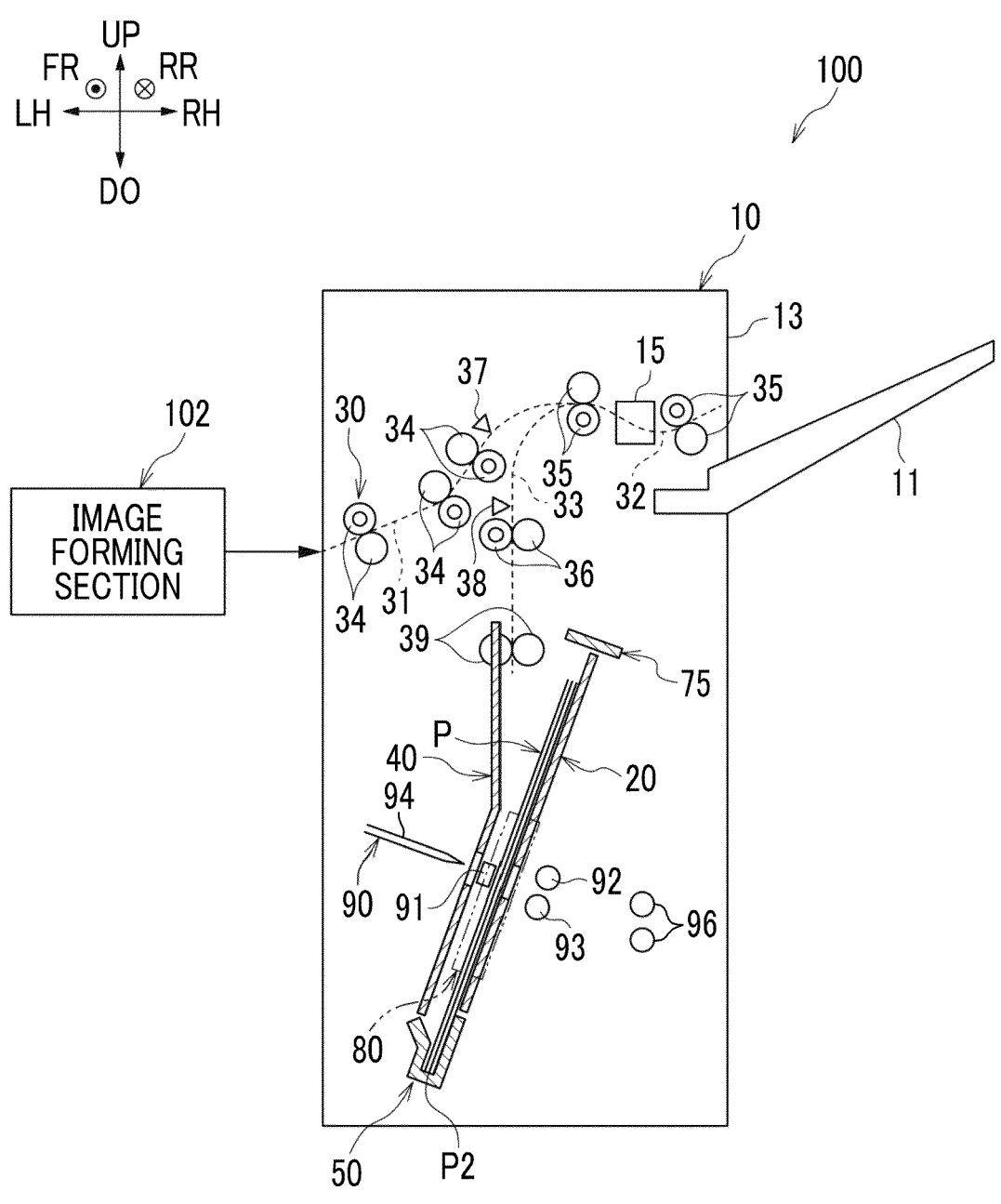
FIG. 1 is a schematic diagram showing an image forming apparatus according to a present exemplary embodiment.

First, a configuration of an image forming apparatus 100 according to the present exemplary embodiment will be described. FIG. 1 is a schematic diagram showing the configuration of the image forming apparatus 100 according to the present exemplary embodiment.

An arrow UP shown in the drawing indicates an upper side of the apparatus, and an arrow DO indicates a lower side of the apparatus. Further, an arrow LH shown in the drawing indicates a left side of the apparatus and an arrow RH indicates a right side of the apparatus. Furthermore, an arrow FR shown in the drawing indicates a front side of the apparatus and an arrow RR indicates a rear side of the apparatus. Since these directions are directions determined for the sake of convenience of description, the configuration of the apparatus is not limited by these directions. It should be noted that regarding each of the directions relating to the apparatus, the term "apparatus" may be omitted. That is, for example, "the upper side of the apparatus" may simply be described as "the upper side."

Also, in the following description, the term "up-down direction" may be used to mean "both of an upward direction and a downward direction" or "any one of the upward direction or the downward direction". A term "right-left direction" may be used to mean "both of a rightward direction and a leftward direction" or "any one of the rightward direction or the leftward direction". It should be noted that the "right-left direction" may also be referred to as a lateral direction, a transverse direction, and a horizontal direction. A term "front-rear direction" may be used to mean "both of a forward direction and a rearward direction" or "any one of the forward direction or the rearward direction". It should be noted that the "front-rear direction" may also be referred to as a lateral direction, a transverse direction, and a horizontal direction. Further, the up-down direction, the right-left direction, and the front-rear direction are directions that intersect each other (specifically, directions orthogonal to each other).

Further, a symbol in which "x" is in "o" in the drawings means an arrow from the front to the back of the sheet surface. Furthermore, a symbol in which "." is in "o" in the drawings means an arrow from the back to the front of the sheet surface. Moreover, dimensional ratios of parts shown in the respective drawings in the up-down direction, the right-left direction, and the front-rear direction may differ from actual dimensional ratios.

The image forming apparatus 100 shown in FIG. 1 is an apparatus that forms an image on a recording medium P, and includes an image forming section 102 and a post-processing device 10 as shown in FIG. 1. Hereinafter, each section of the image forming apparatus 100 (specifically, the image forming section 102 and the post-processing device 10) will be described.

Image Forming Section 102

The image forming section 102 shown in FIG. 1 is a constituent section that forms an image on the recording medium P. For example, an electrophotographic image forming section that forms an image on the recording medium P using toner is used as the image forming section 102.

In the electrophotographic image forming section, for example, each step of charging, exposure, development, transfer, and fixing is performed to form an image on the recording medium P. Specifically, as the electrophotographic image forming section, for example, each step of charging, exposure, development, and transfer can be performed to form an image on a transfer body, the image can be transferred from the transfer body to the recording medium P, and then the image can be fixed on the recording medium P to form an image on the recording medium P.

An example of the image forming section is not limited to the electrophotographic image forming section described above and may be, for example, an inkjet image forming section, and various image forming sections can be used. In the inkjet image forming section, for example, an ink droplet is ejected from a discharge section to the recording medium P to form an image on the recording medium P.

Post-Processing Device 10

The post-processing device 10 shown in FIG. 1 is a device that executes post-processing on the recording medium P on which the image forming section 102 forms an image. Specifically, as shown in FIG. 1, the post-processing device 10 includes a post-processing device body 13, an ejection section 11, a post-processing section 15, a loading section 20, a guiding section 40, and a supporting section 50, a transporting mechanism 30, transporting rollers 39, an abutting section 75, an aligning section 80, and a post-processing section 90. Hereinafter, description will be given of each section of the post-processing device 10 (specifically, the post-processing device body 13, the ejection section 11, the post-processing section 15, the loading section 20, the guiding section 40, the supporting section 50, the transporting mechanism 30, the transporting rollers 39, the abutting section 75, the aligning section 80, and the post-processing section 90).

Post-Processing Device Body 13, Ejection Section 11, and Post-Processing Section 15

The post-processing device body 13 shown in FIG. 1 is a part in which the constituent sections of the post-processing device 10 are provided. Specifically, the post-processing device body 13 is configured to include a housing formed in a box-like shape (for example, a substantially rectangular parallelepiped shape).

In the present exemplary embodiment, as shown in FIG. 1, for example, the post-processing section 15, the loading section 20, the guiding section 40, the supporting section 50, the transporting mechanism 30, the transporting rollers 39, the abutting section 75, the aligning section 80, and the post-processing section 90 are provided inside the post-processing device body 13. The ejection section 11 is provided on a right side surface of the post-processing device body 13.

The ejection section 11 is disposed at an upper portion on a right side surface of the post-processing device body 13. The recording medium P, of which the post-processing has been executed by the post-processing section 15, is ejected to the ejection section 11.

Here, the post-processing is processing executed on the recording medium P on which the image is formed. As the post-processing executed by the post-processing section 15, there is binding processing of binding a plurality of recording media P with a stapler. It should be noted that the post-processing is not limited to the binding processing. The post-processing may be, for example, cutting processing of cutting the recording medium P, drilling processing of making a hole in the recording medium P, or the like, and may be processing executed on the recording medium P on which an image is formed.

Loading Section 20

Figure 15:
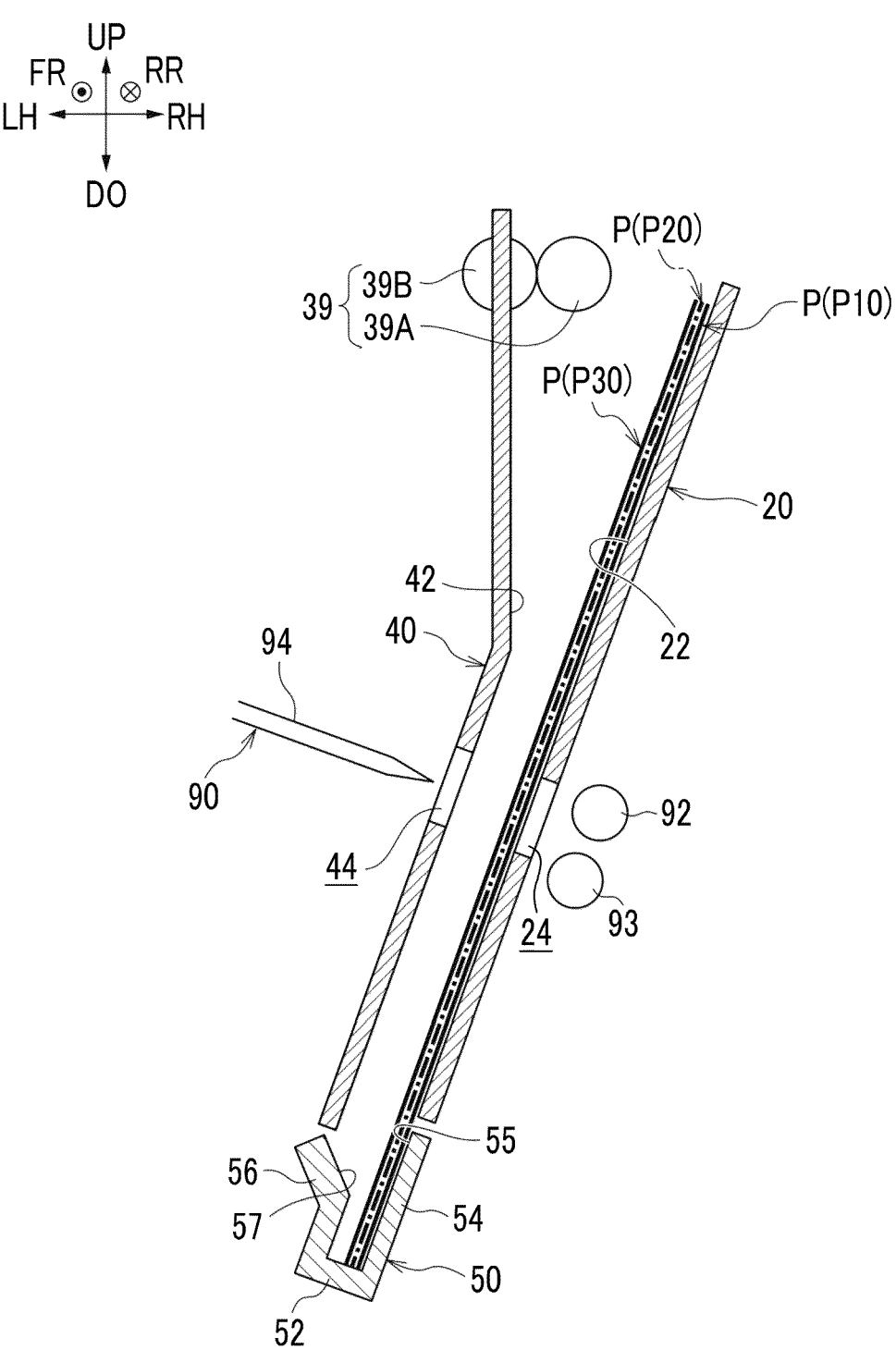
FIG. 15 is a schematic diagram showing a state where three overlapping recording media are loaded on the loading surface in the post-processing device according to the present exemplary embodiment.

The loading section 20 shown in FIGS. 1 and 15 is a constituent section on which the recording medium P is loaded. In the present exemplary embodiment, as shown in FIG. 15, the loading section 20 is configured to have a plate body which extends obliquely upward (toward the obliquely upper right side, in the present exemplary embodiment) in a normal cross-sectional view. The loading section 20 has a loading surface 22 that is directed obliquely upward (toward the obliquely upper left side, in the present exemplary embodiment). In the loading section 20, the recording medium P is loaded on the loading surface 22 in a state where one end (hereinafter, referred to as a lower end P2) of the recording medium P faces downward (refer to FIG. 15). The loading section 20 is formed with a passage hole 24 through which the push-in portion 94 to be described later passes.

Guiding Section 40

The guiding section 40 shown in FIGS. 1 and 15 is a constituent section that guides the recording medium P transported by the transporting rollers 39. In the present exemplary embodiment, as shown in FIG. 15, the guiding section 40 is configured by using a plate body which extends obliquely upward (toward the obliquely upper right side, in the present exemplary embodiment) in a normal cross-sectional view. The guiding section 40 has a guiding surface 42 that is directed obliquely downward (toward the obliquely lower right side, in the present exemplary embodiment) and faces toward the loading surface 22. In the guiding section 40, the guiding surface 42 guides the recording medium P to the loading surface 22. The guiding section 40 is formed with a passage hole 44 through which the push-in portion 94 to be described later passes.

Supporting Section 50

The supporting section 50 shown in FIGS. 1 and 15 is a constituent section that supports the lower end P2 of the recording medium P loaded on the loading surface 22. As shown in FIGS. 1 and 15, the supporting section 50 is disposed on the obliquely lower left side with respect to the loading section 20. As shown in FIG. 15, the supporting section 50 has an abutting part 52, a loading part 54, and a guiding part 56.

The abutting part 52 abuts against the lower end P2 of the recording medium P loaded on the loading surface 22 and supports the lower end P2. In a plurality of recording media P loaded on the loading surface 22, the lower end P2 is aligned by abutting the lower end P2 against the abutting part 52.

The loading part 54 is loaded with a lower portion of the recording medium P to which the lower end P2 is abutted against the abutting part 52. The loading part 54 has a loading surface 55 that is directed obliquely upward (toward the obliquely upper left side, in the present exemplary embodiment). The loading surface 55 is disposed on the obliquely lower left side with respect to the loading surface 22 of the loading section 20 and is disposed along the loading surface 22.

The guiding part 56 guides the lower end P2 of the recording medium P guided by the guiding section 40 to the abutting part 52 side. The guiding part 56 has a guiding surface 57 facing toward the loading surface 55. In the guiding part 56, the guiding surface 57 guides the recording medium P to the abutting part 52.

Transporting Mechanism 30

The transporting mechanism 30 shown in FIG. 1 is a mechanism that transports the recording medium P to the loading section 20. The transporting mechanism 30 has a function (so-called buffer function) of temporarily holding the recording media P transported one by one from the image forming section 102, stacking a plurality of recording media P, and transporting the recording media P toward the loading section 20.

Figure 2:
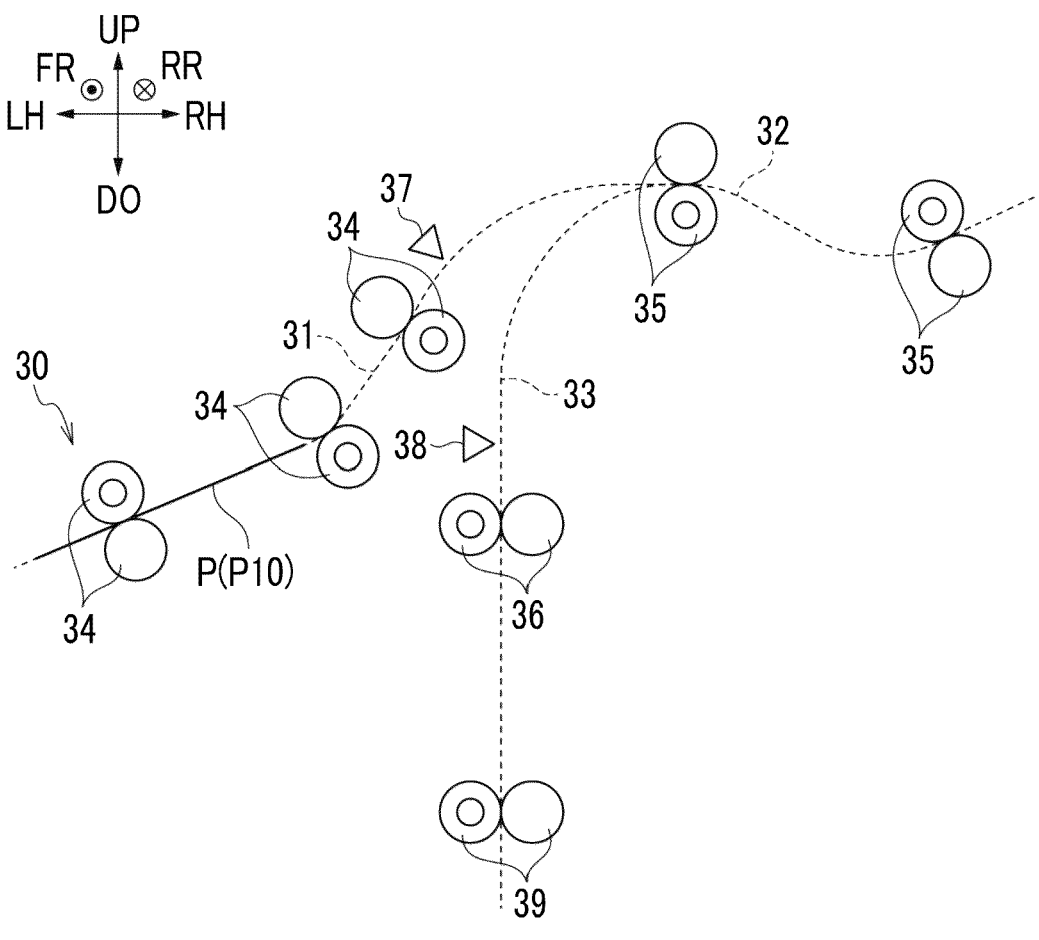
FIG. 2 is a schematic diagram showing a transporting mechanism according to the present exemplary embodiment.

Specifically, as shown in FIGS. 1 and 2, the transporting mechanism 30 includes a first path 31, a second path 32, a third path 33, transporting rollers 34, 35, and 36, a first detection portion 37, and a second detection portion 38.

The first path 31 is a transport path for transporting the recording medium P from the image forming section 102. The transporting rollers 34 and the first detection portion 37 are disposed on the first path 31. The first detection portion 37 detects an end portion (for example, an apical end portion) of the recording medium P transported along the first path 31.

In the present exemplary embodiment, the plurality of transporting rollers 34 are provided in the first path 31, and the recording medium P is transported in the first path 31. The transporting rollers 34 are able to control a speed of transport of the recording medium P. Further, the transporting rollers 34 are able to control the transport timing of transporting the recording medium P to the second path 32 on the basis of the detection result of the first detection portion 37.

The second path 32 is a transport path for transporting the recording medium P from the first path 31. The transporting rollers 35 are disposed on the second path 32. In the present exemplary embodiment, the plurality of transporting rollers 35 are provided on the second path 32. The plurality of transporting rollers 35 are capable of forward and reverse rotation, and are able to switch back the recording medium P in the second path 32. The recording medium P is ejected to the ejection section 11 through the forward rotation of the plurality of transporting rollers 35. The recording medium P switched back in the second path 32 is transported to the third path 33 through the reverse rotation of the plurality of transporting rollers 35.

The third path 33 is a transport path for transporting the recording medium P from the second path 32. The transporting rollers 36 and the second detection portion 38 are disposed on the third path 33. The second detection portion 38 detects an end portion (for example, an apical end portion) of the recording medium P transported through the third path 33.

The plurality of transporting rollers 36 are capable of forward and reverse rotation, and the recording medium P can be switched back in the third path 33. The recording medium P is transported to the loading section 20 through the forward rotation of the plurality of transporting rollers 36. Therefore, in the transporting mechanism 30, the recording medium P can be selectively transported to one of the ejection section 11 and the loading section 20.

Further, the recording medium P switched back in the third path 33 is transported to the second path 32 through the reverse rotation of the transporting rollers 36. The transporting rollers 36 are able to control the speed of transport of the recording medium P. Further, the transporting rollers 36 are able to control the transport timing at which the recording medium P is transported to the second path 32, on the basis of the detection result of the second detection portion 38.

The transporting mechanism 30 transports a plurality of recording media P toward the loading section 20 by shifting and stacking the recording media P transported one by one from the image forming section 102 in a transport direction (refer to FIGS. 2 to 10), and sets an amount of shift of the recording media P on the basis of a predetermined condition. The amount of shift is a distance between the lower ends P2 (that is, downstream ends in the transport direction) of each of the plurality of recording media P in the transport direction.

The predetermined condition is, for example, a density of an image formed on the recording medium P (hereinafter, referred to as an image density). The image density is, for example, an area of an image per unit area in all of the recording media P. The transporting mechanism 30 is able to set the amount of shift on the basis of the image density in the image data of the image formed by the image forming section 102. Further, the transporting mechanism 30 may set the amount of shift on the basis of the information of the image density which is obtained by reading the image formed on the recording medium P by the image forming section 102.

In the present exemplary embodiment, the transporting mechanism 30 sets the amount of shift of the recording medium Pas the first amount (for example, 5 mm) in a case where the image density of the recording medium P is the first density, and sets the amount of shift of the recording medium Pas a second amount (for example, 10 mm) greater than the first amount in a case where the image density of the recording medium P is a second density higher than the first density.

Further, in a case where the plurality of recording media Pare stacked, the transporting mechanism 30 may change the amount of shift between the recording media P. Specifically, for example, in a case where n recording media P are stacked, it is possible to set an amount of shift between the first and second sheets≤an amount of shift between the second and third sheets≤ . . . ≤an amount of shift between ((n−2)−(n−1))th sheets. It should be noted that the amount of shift between the ((n−1)−n)th sheet is not limited thereto since the transport distance is short.

Example of Transport Operation of Transporting Mechanism 30

In the transporting mechanism 30, for example, in a case where three recording media P are stacked and transported to the loading section 20, the transport operation is executed as shown in FIGS. 2 to 10.

Figure 3:
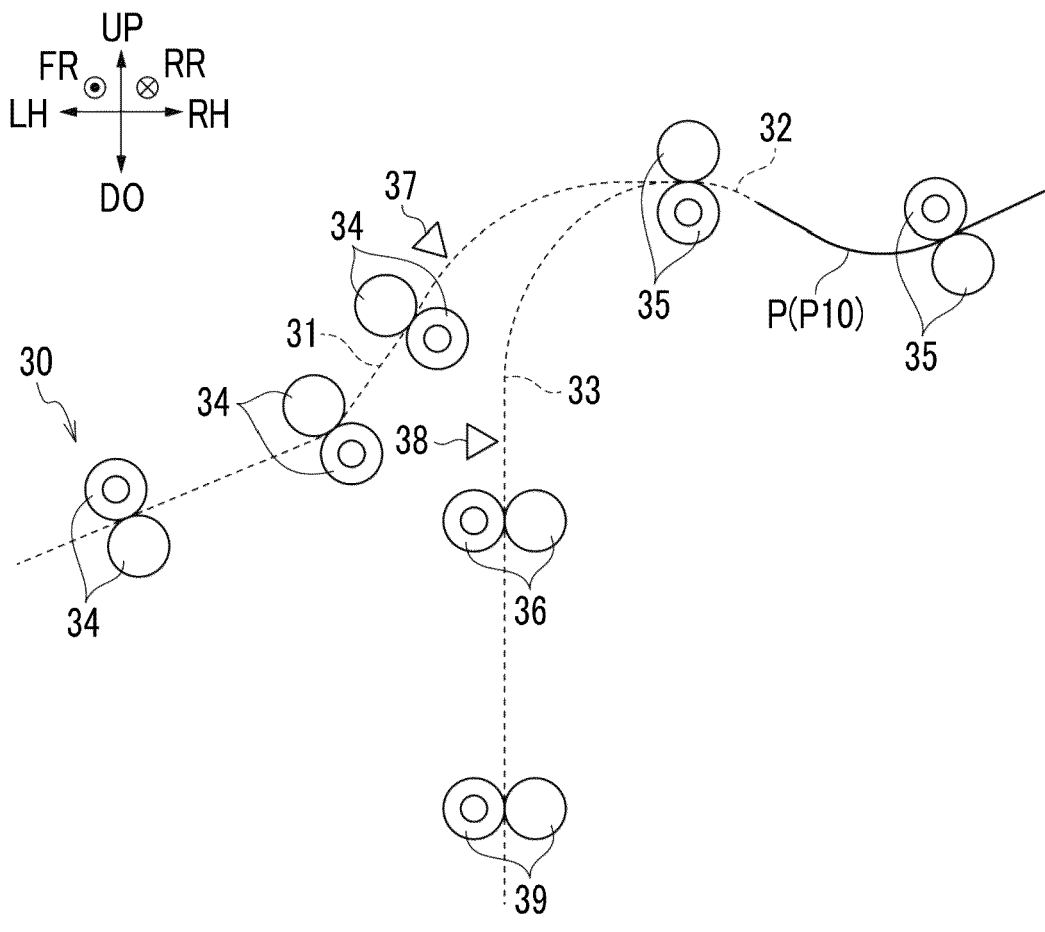
FIG. 3 is a schematic diagram showing a state where a recording medium is transported to a second path in the transporting mechanism according to the present exemplary embodiment.

In the transporting mechanism 30, as shown in FIG. 2, the first recording medium P10 transported from the image forming section 102 to the first path 31 is transported to the second path 32 as shown in FIG. 3.

Figure 4:
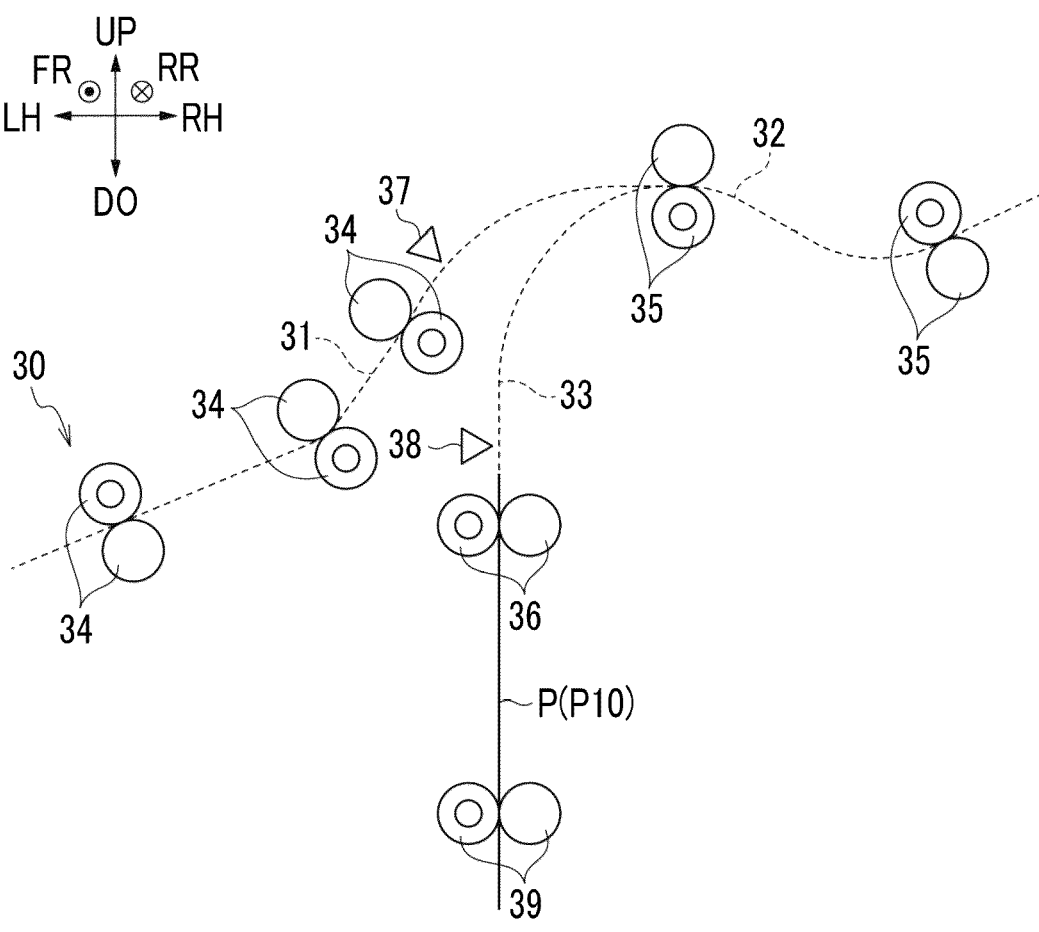
FIG. 4 is a schematic diagram showing a state where a recording medium is transported to a third path in the transporting mechanism according to the present exemplary embodiment.
Figure 5:
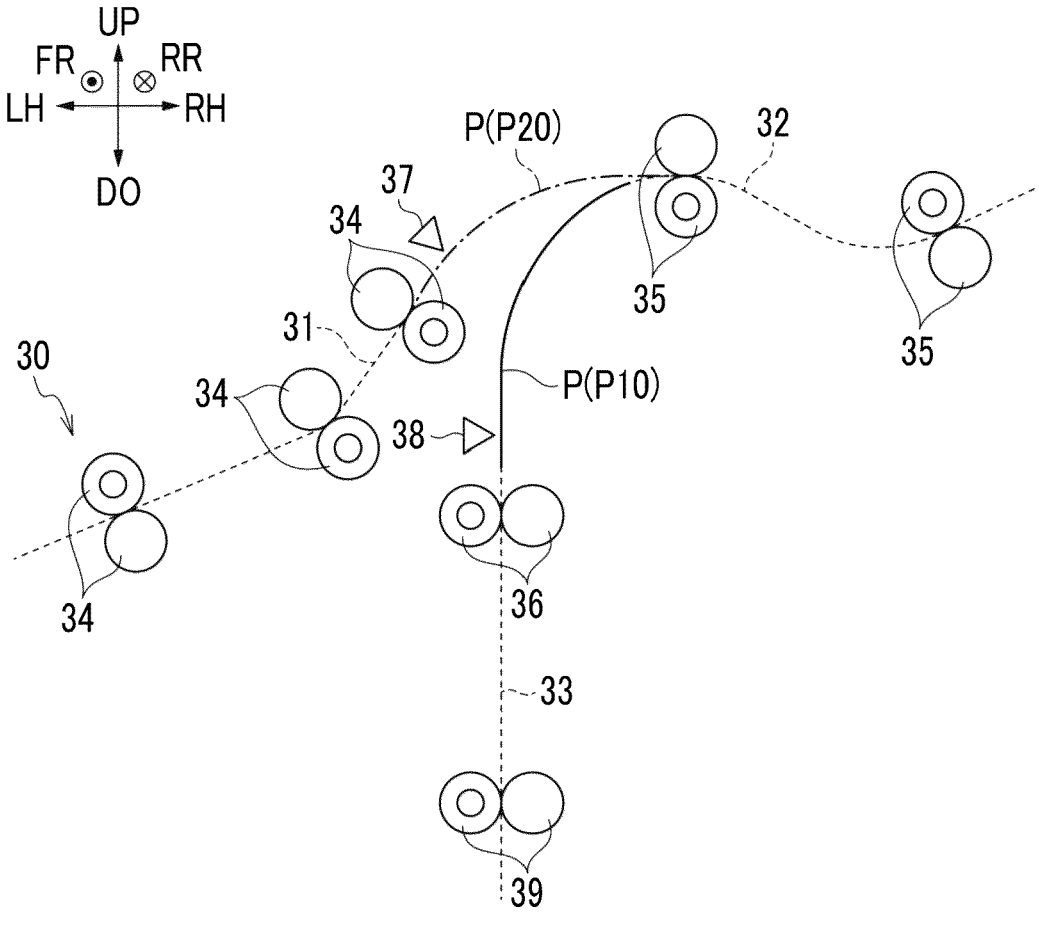
FIG. 5 is a schematic diagram showing a state immediately before the two recording media overlap with each other in the transporting mechanism according to the present exemplary embodiment.
Figure 6:
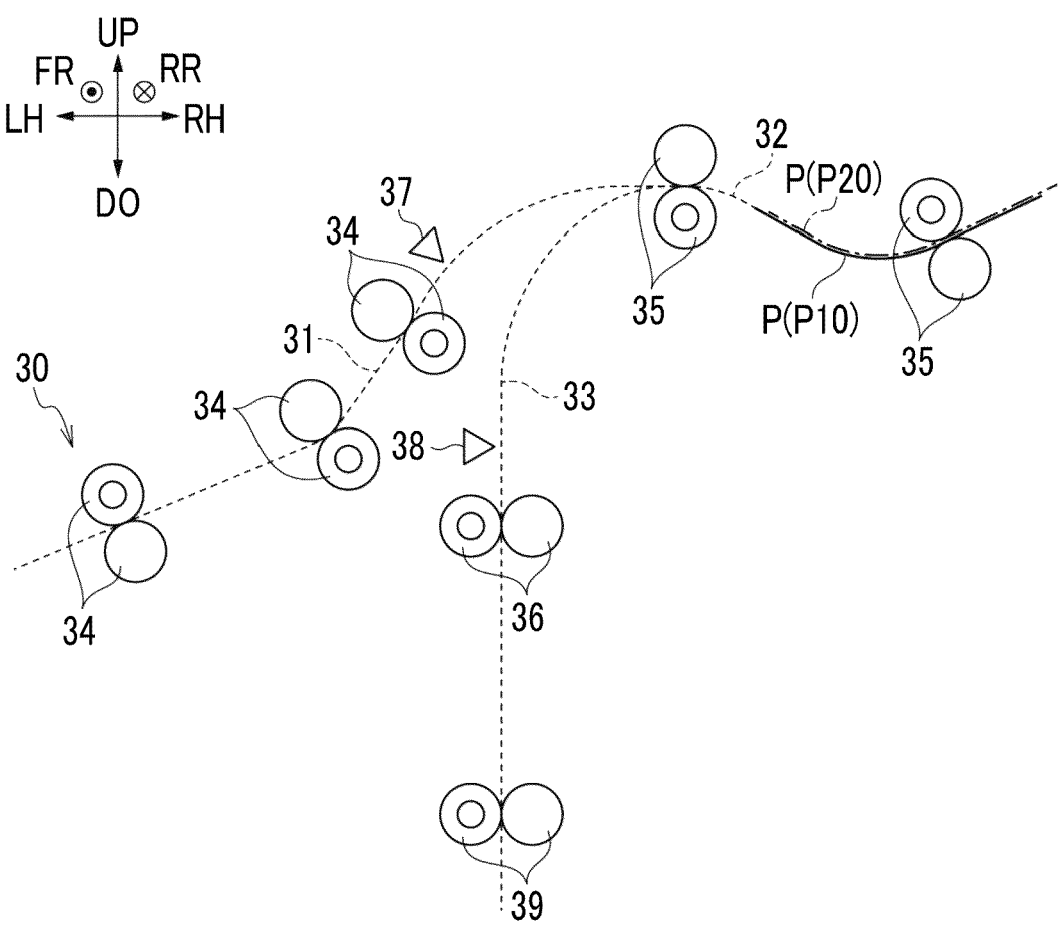
FIG. 6 is a schematic diagram showing a state where two overlapping recording media are transported to the second path in the transporting mechanism according to the present exemplary embodiment.

Next, the recording medium P10 is transported from the second path 32 to the third path 33 as shown in FIG. 4. Then, as shown in FIGS. 5 and 6, the recording medium P10 transported to the third path 33 and the second recording medium P20 transported from the image forming section 102 to the first path 31 are transported to the second path 32 such that the recording medium P10 and the recording medium P20 overlap with each other. In such a case, the transporting rollers 36 control the transport timing of transporting the recording medium P10 to the second path 32 on the basis of the detection result of the second detection portion 38. In addition, the transporting rollers 34 control the transport timing for transporting the recording medium P20 to the second path 32 on the basis of the detection result of the first detection portion 37. Thereby, the amount of shift between the recording medium P10 and the recording medium P20 in the transport direction is set.

In the present exemplary embodiment, the recording media P10 and P20 are shifted in the transport direction such that the recording medium P20 precedes the recording medium P10 in the second path 32, as shown in FIG. 6.

Figure 7:
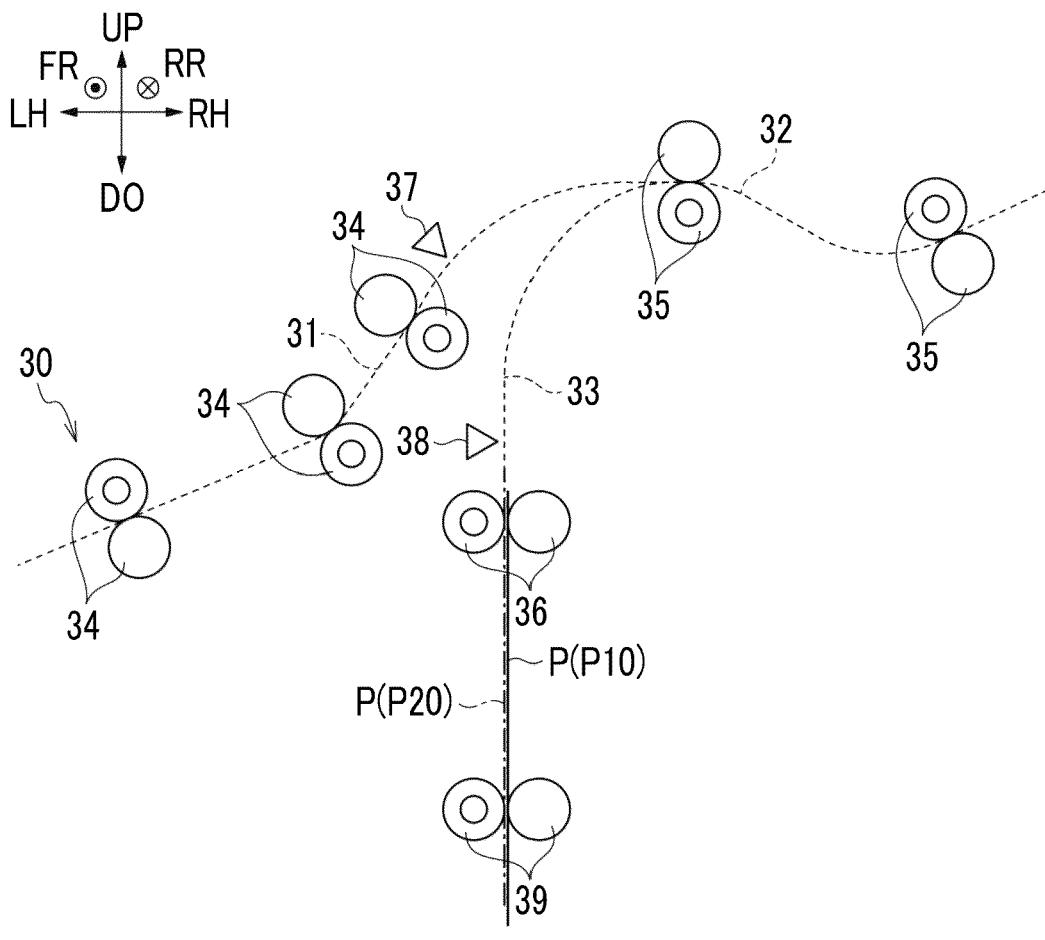
FIG. 7 is a schematic diagram showing a state where two overlapping recording media are transported to the third path in the transporting mechanism according to the present exemplary embodiment.

Next, the stacked recording media P10 and P20 are transported from the second path 32 to the third path 33, as shown in FIG. 7. It should be noted that the recording media P10 and P20 are misaligned in the transport direction such that the recording medium P10 precedes the recording medium P20 in the third path 33.

Figure 8:
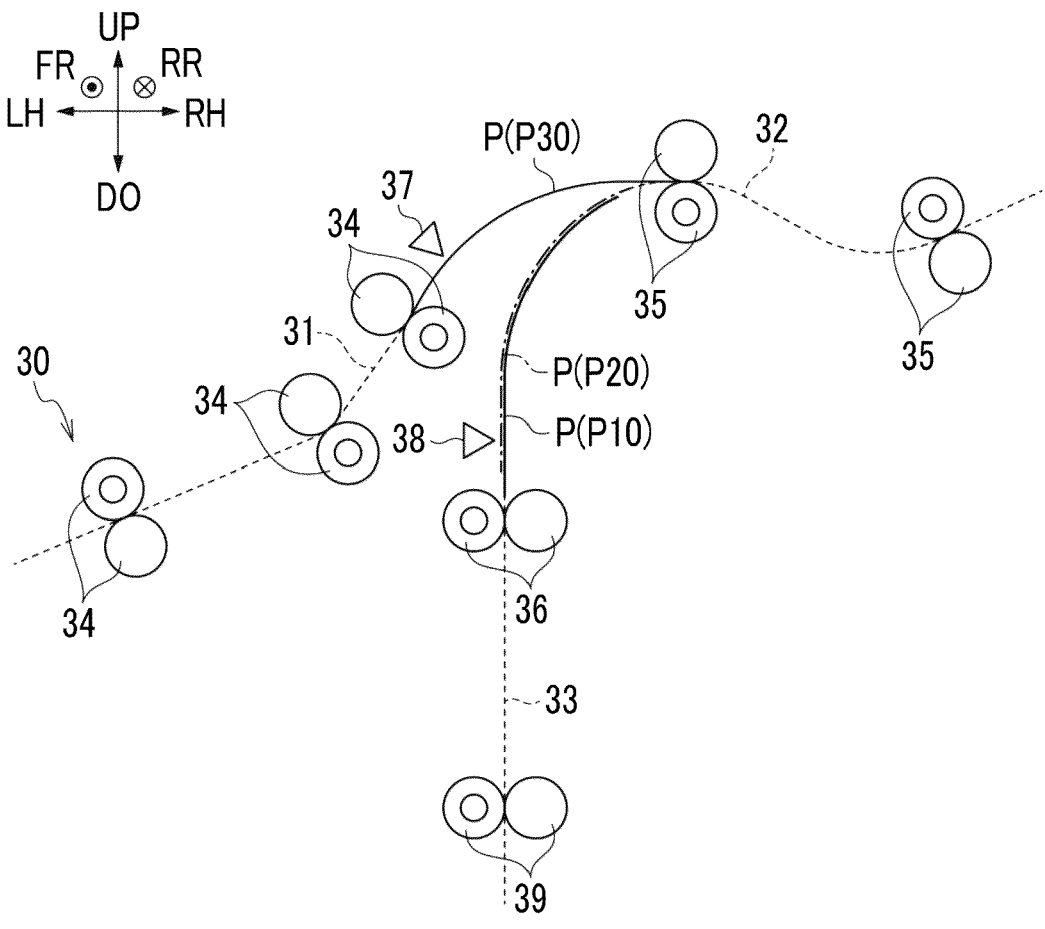
FIG. 8 is a schematic diagram showing a state immediately before another recording medium overlaps with two overlapping recording media in the transporting mechanism according to the present exemplary embodiment.
Figure 9:
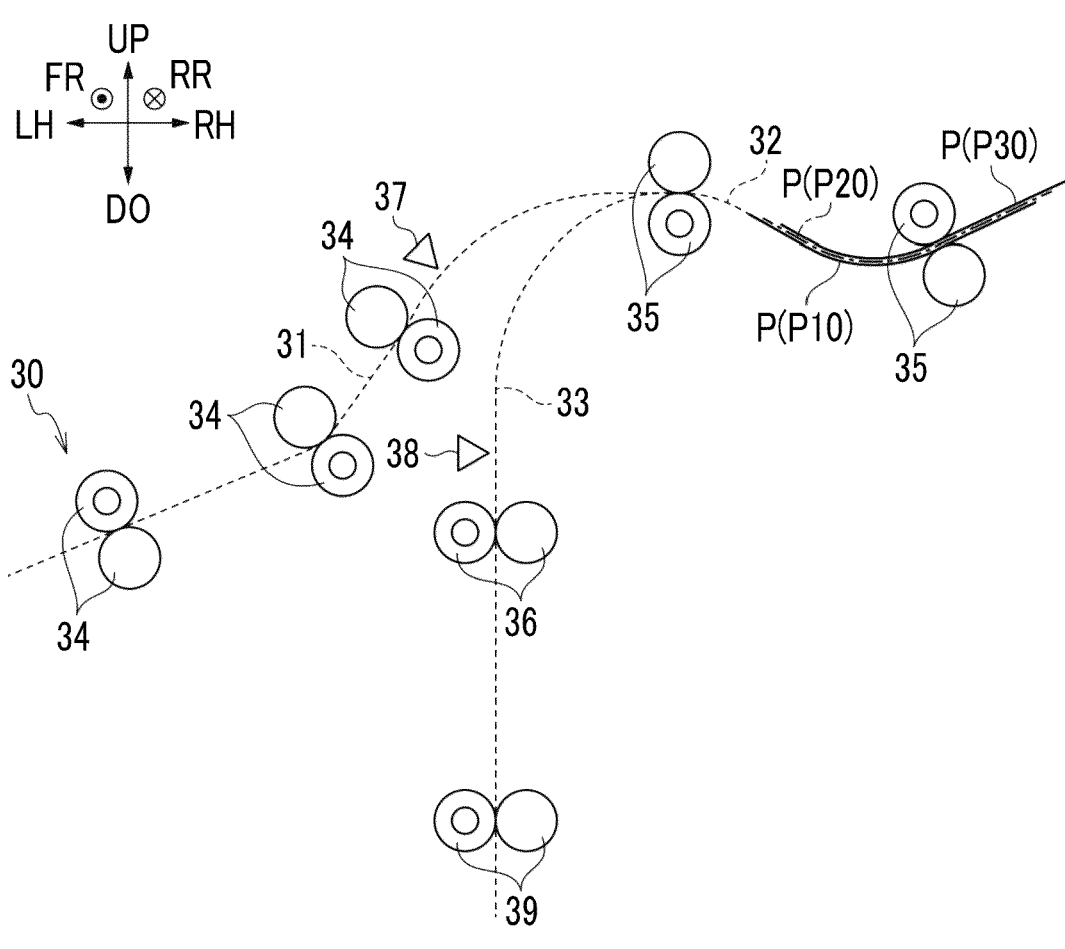
FIG. 9 is a schematic diagram showing a state where three overlapping recording media are transported to the second path in the transporting mechanism according to the present exemplary embodiment.

Next, as shown in FIGS. 8 and 9, the recording media P10 and P20 transported to the third path 33 and the third recording medium P30 transported from the image forming section 102 to the first path 31 are transported to the second path 32 such that the recording media P10 and P20 and the recording medium P30 overlap with each other. In such a case, the transporting rollers 36 control the transport timing of transporting the recording media P10 and P20 to the second path 32 on the basis of the detection result of the second detection portion 38. In addition, the transporting rollers 34 control the transport timing for transporting the recording medium P30 to the second path 32 on the basis of the detection result of the first detection portion 37. Thereby, the amounts of shift between the recording media P10 and P20 and the recording medium P30 in the transport direction are set.

In the present exemplary embodiment, the recording media P10, P20, and P30 are shifted in the transport direction such that the recording medium P30 precedes the recording medium P20 in the second path 32, as shown in FIG. 9.

Figure 10:
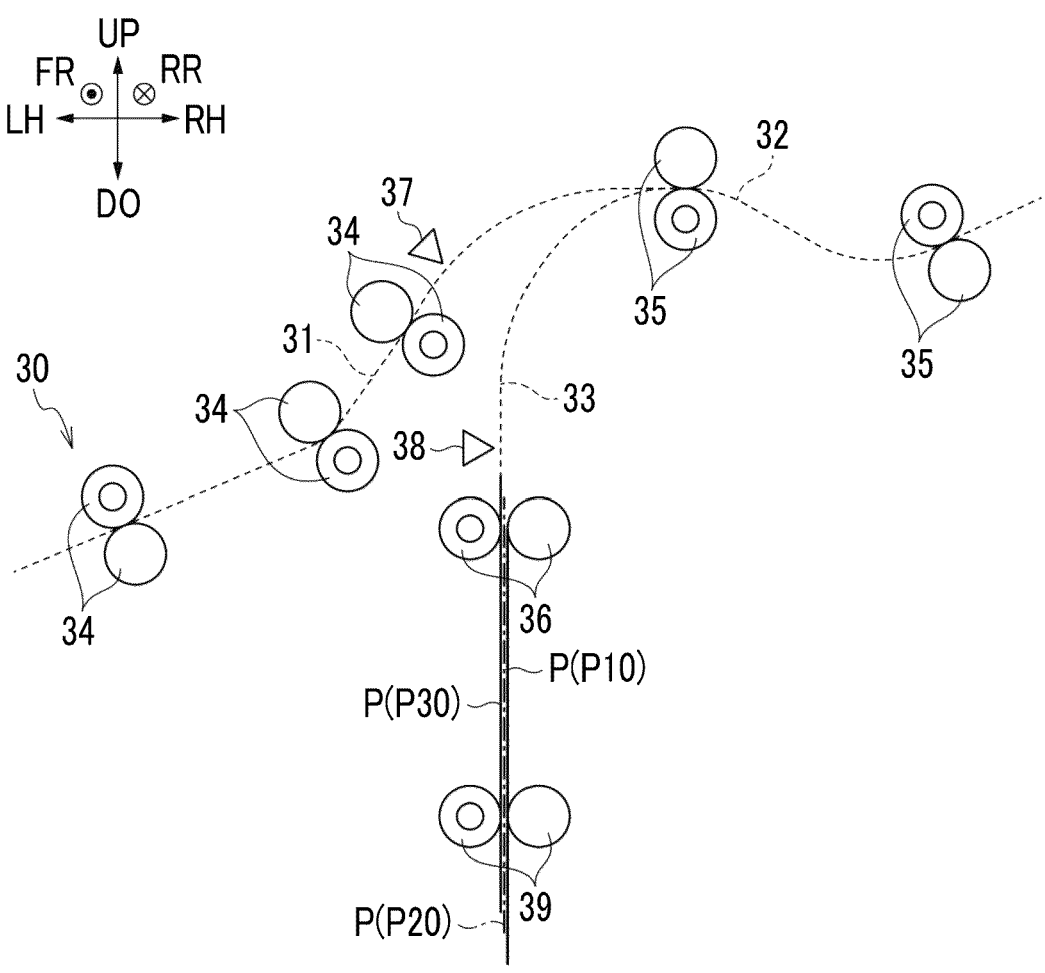
FIG. 10 is a schematic diagram showing a state where three overlapping recording media are transported to the third path in the transporting mechanism according to the present exemplary embodiment.

Next, the stacked recording media P10, P20, and P30 are transported from the second path 32 to the third path 33, as shown in FIG. 10. It should be noted that the recording media P10, P20, and P30 are misaligned in the transport direction such that the recording medium P10 precedes the recording medium P20 and the recording medium P20 precedes the recording medium P30 in the third path 33.

Transporting Roller 39

Figure 11:
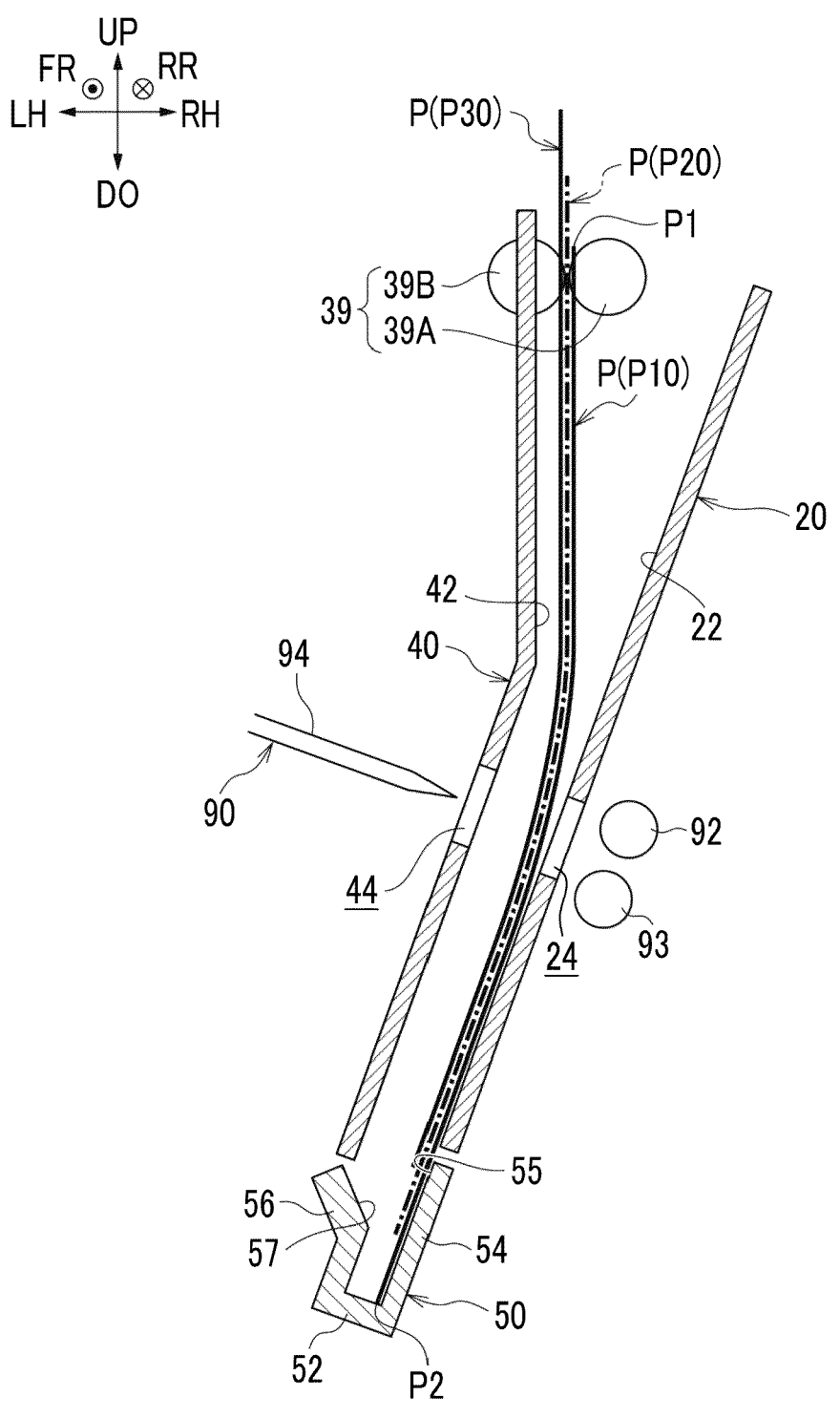
FIG. 11 is a schematic diagram showing a state where three overlapping recording media are transported to a loading section in the post-processing device according to the present exemplary embodiment.

The transporting rollers 39 shown in FIGS. 1 and 11 are an example of the transporting section, and are a constituent section that transports each of the plurality of recording media P transported from the transporting mechanism 30. The transporting rollers 39 bend each of the recording media P by applying a transport force to the upper end P1 of the recording medium P in a state where the lower end P2 is in contact with the supporting section 50, and separate the recording media P one by one and load the recording media P on the loading section 20.

In the present exemplary embodiment, the transporting rollers 39 are provided at a position facing toward the upper portion of the loading surface 22, and transport the recording medium P downward toward the loading surface 22. Specifically, the transporting rollers 39 include a driving roller 39A and a driven roller 39B, and transport the recording medium P with the pair of rollers sandwiching the recording medium P. The driving roller 39A is disposed on the loading section 20 side (on the right side in the present exemplary embodiment) with respect to the driven roller 39B. The driven roller 39B is disposed on a side opposite to the loading section 20 with respect to the driving roller 39A (on the left side, in the present exemplary embodiment).

Example of Loading Operation of Transporting Rollers 39

In the transporting rollers 39, as shown in FIGS. 11 to 15, the loading operation is executed such that the three recording media P10, P20, and P30 stacked in a state of being misaligned along the transport direction by the transporting mechanism 30 are loaded on the loading surface 22.

As shown in FIG. 11, the transporting rollers 39 transport the three recording media P10, P20, and P30 onto the loading surface 22 in a state where the recording media P10, P20, and P30 are misaligned in the transport direction such that the recording medium P10 on the right side (the driving roller 39A side) precedes the recording medium P20 and the recording medium P20 precedes the recording medium P30.

Figure 12:
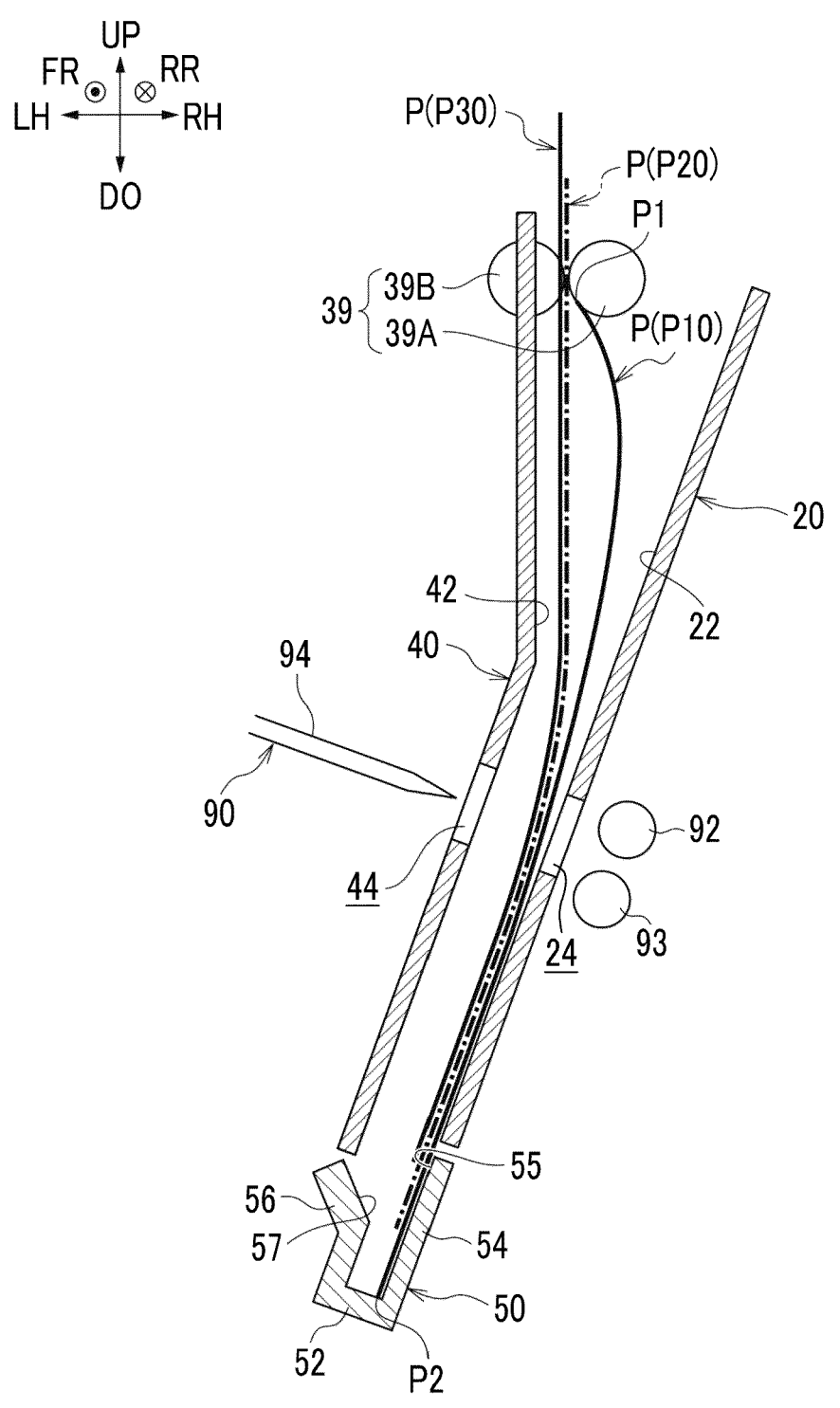
FIG. 12 is a schematic diagram showing a state immediately before a first recording medium among the three overlapping recording media is separated and loaded on a loading surface in the post-processing device according to the present exemplary embodiment.
Figure 13:
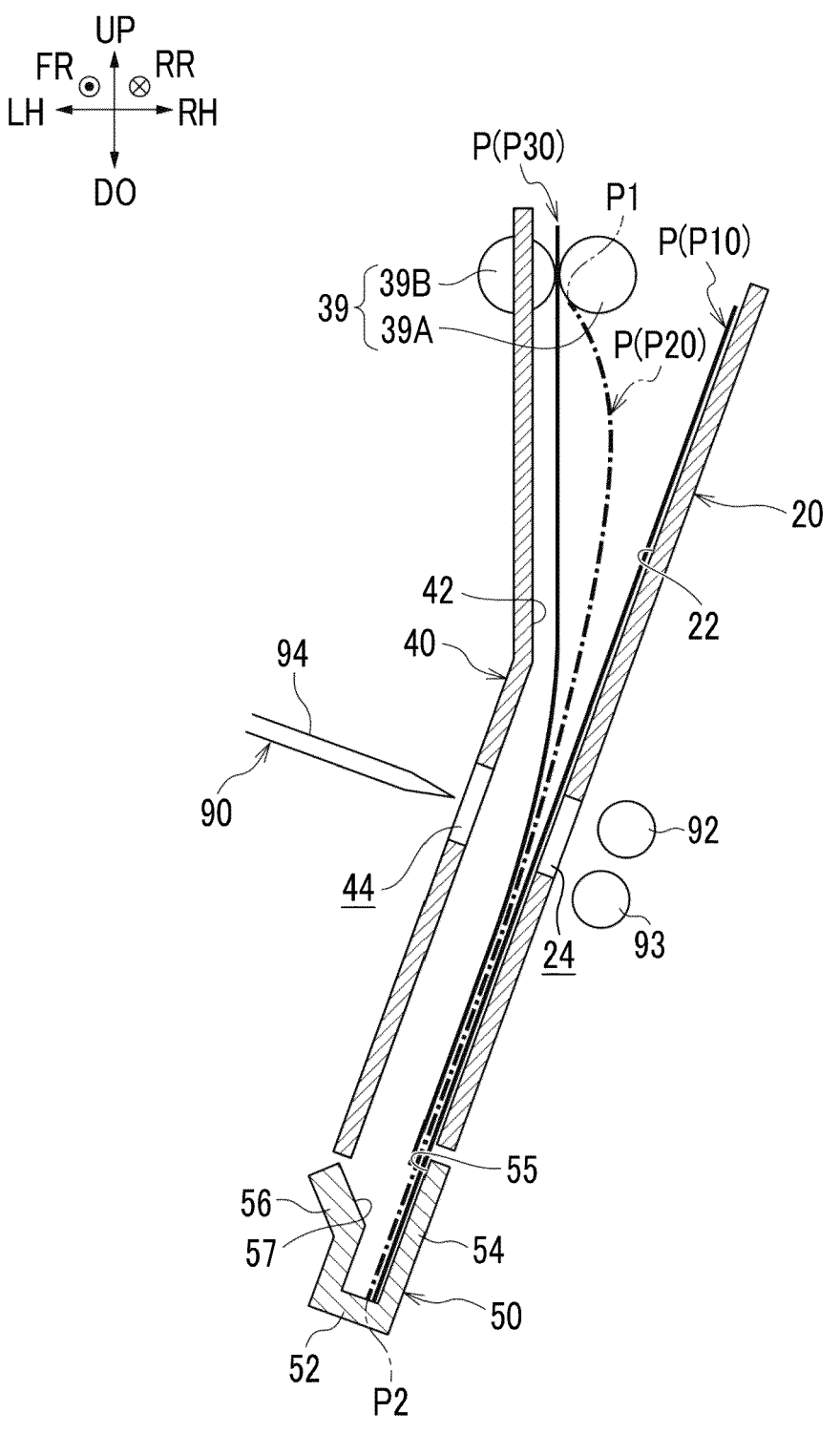
FIG. 13 is a schematic diagram showing a state immediately before a second recording medium among the three overlapping recording media is separated and loaded on the loading surface in the post-processing device according to the present exemplary embodiment.

As shown in FIG. 11, in a case where the lower end P2 of the first recording medium P10 comes into contact with the supporting section 50, the transporting rollers 39 bend the recording medium P10 as shown in FIGS. 12 and 13, by applying a transport force to the upper end P1 of the recording medium P10 in a state where the lower end P2 comes into contact with the supporting section 50, and separate the recording medium P10 from the recording medium P20 and load the recording medium P10 on the loading section 20.

Figure 14:
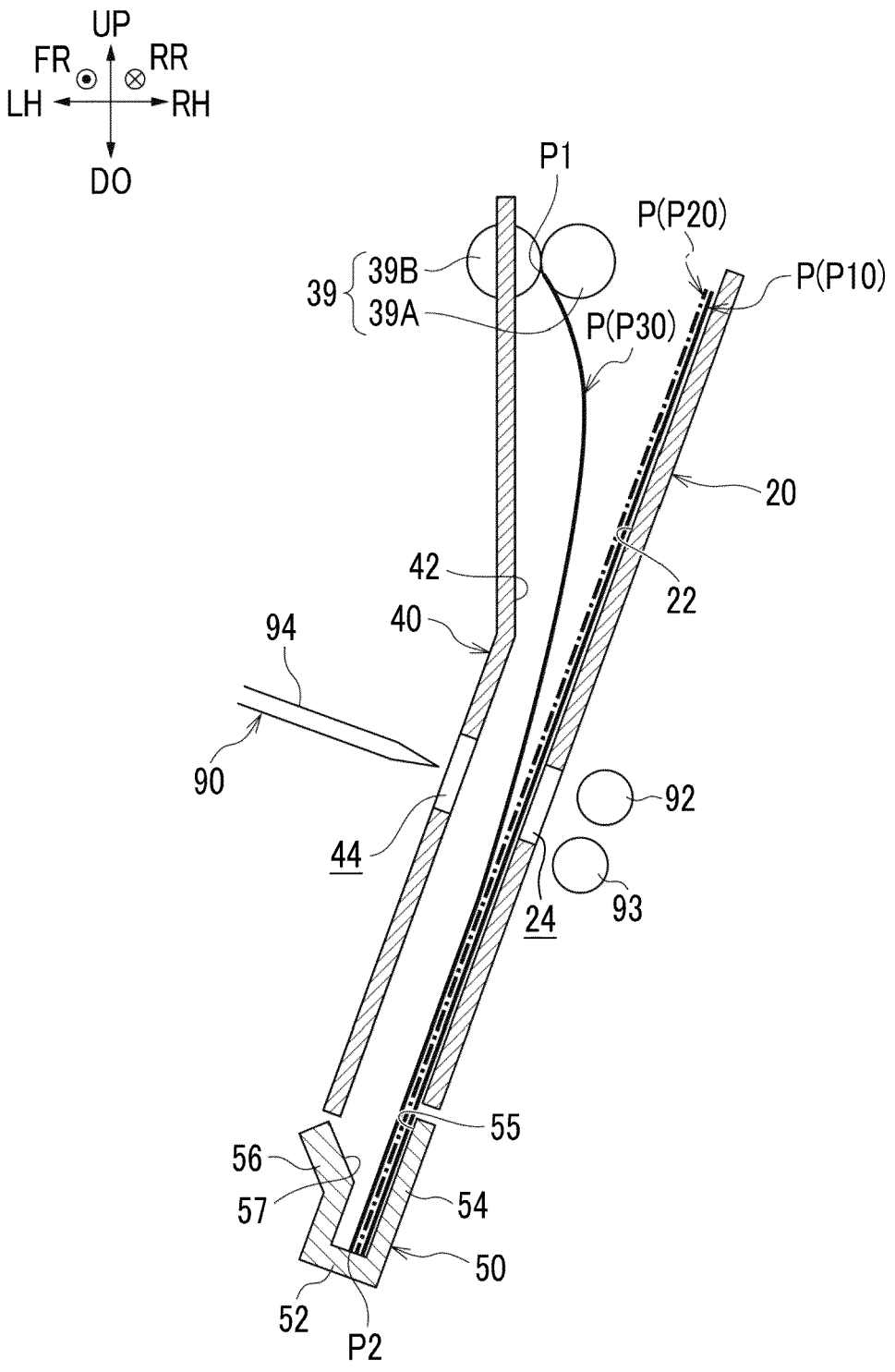
FIG. 14 is a schematic diagram showing a state immediately before a third recording medium among the three overlapping recording media is loaded on the loading surface in the post-processing device according to the present exemplary embodiment.

Next, as shown in FIG. 13, in a case where the lower end P2 of the second recording medium P20 comes into contact with the supporting section 50, the transporting rollers 39 bend the recording medium P20 as shown in FIGS. 13 and 14, by applying a transport force to the upper end P1 of the recording medium P20 in a state where the lower end P2 comes into contact with the supporting section 50, and separate the recording medium P20 from the recording medium P30 and load the recording medium P20 on the loading section 20.

Then, as shown in FIG. 14, in a case where the lower end P2 of the third recording medium P30 comes into contact with the supporting section 50, the transporting rollers 39 bend the recording medium P30 as shown in FIGS. 14 and 15, by applying a transport force to the upper end P1 of the recording medium P30 in a state where the lower end P2 comes into contact with the supporting section 50, and load the recording medium P30 on the loading section 20. In such a manner, the three recording media P10, P20, and P30 are loaded on the loading surface 22 while being separated one by one.

Abutting Section 75

Figure 16:
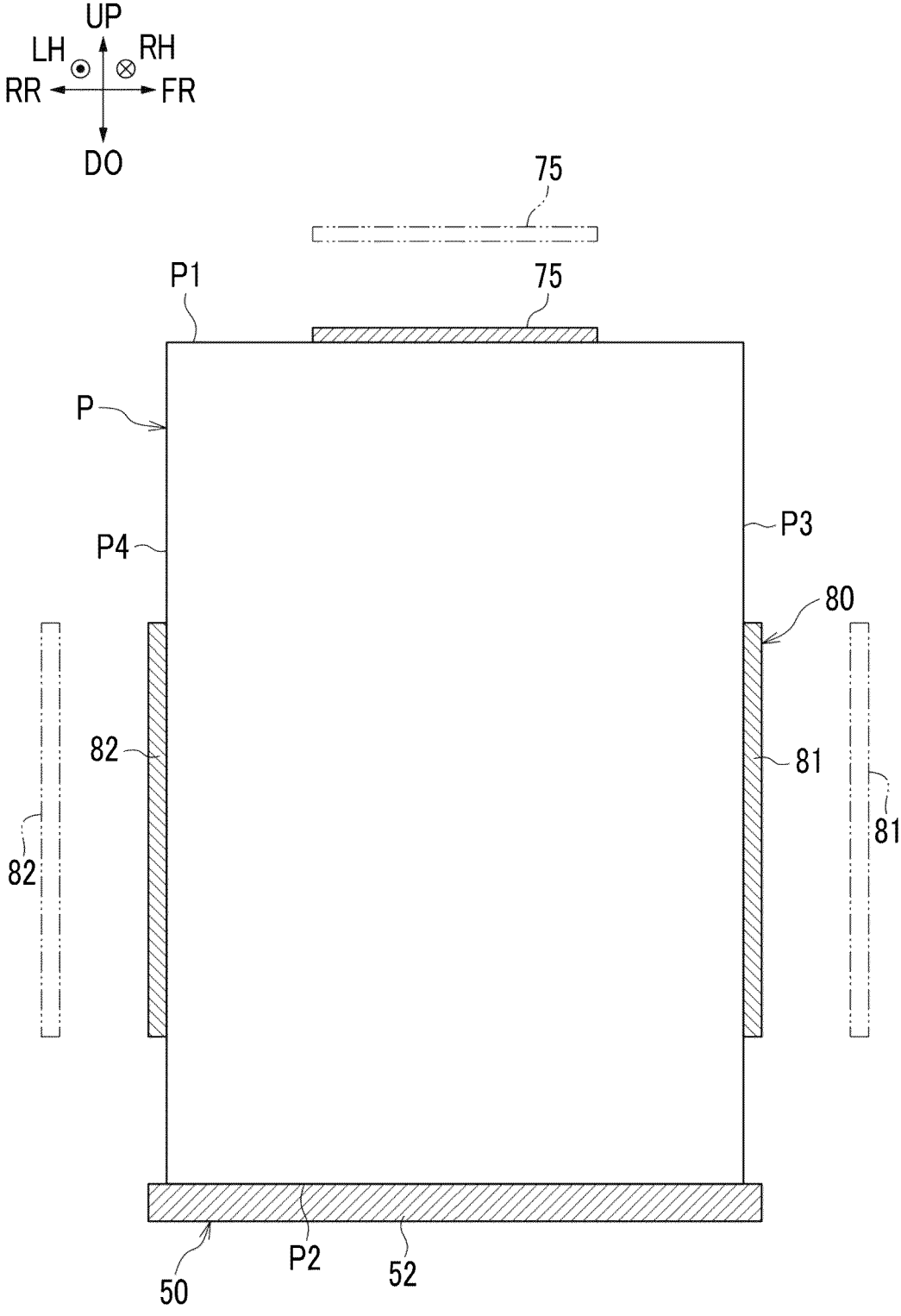
FIG. 16 is an enlarged side view showing a part of the post-processing device according to the present exemplary embodiment.

As shown in FIG. 16, the abutting section 75 pushes the upper end P1 of the recording medium P downward and abuts the lower end P2 against the supporting section 50. Thereby, the upper end P1 of the recording medium P (in other words, the position of the recording medium P in the up-down direction) is aligned. It should be noted that the upper end P1 is an end portion of the recording medium P opposite to the lower end P2.

In the present exemplary embodiment, the abutting section 75 moves from a non-contact position (a position indicated by the two-dot chain line in FIG. 16) that is not in contact with the recording medium P loaded on the loading surface 22, and pushes the upper end P1 of the recording medium P downward. The non-contact position is also a position at which the abutting section 75 is separated from the transport path of the recording medium P transported to the loading surface 22. In addition, the abutting section 75 returns to the non-contact position after the lower end P2 of the recording medium P is abutted against the supporting section 50.

Aligning Section 80

The aligning section 80 shown in FIGS. 1 and 16 is a constituent section that aligns the side ends of the recording medium P. As shown in FIG. 16, the aligning section 80 has a first aligning portion 81 and a second aligning portion 82.

In the aligning section 80, the first aligning portion 81 comes into contact with a side end (hereinafter, referred to as a front end P3) of one side (front side in the present exemplary embodiment) of the recording medium P, and the second aligning portion 82 comes into contact with a side end (hereinafter, referred to as the rear end P4) of the other side (rear side in the present exemplary embodiment) of the recording medium P. Thereby, the side ends of the recording medium P (in other words, positions of the recording medium P in the front-rear direction) are aligned.

In the present exemplary embodiment, each of the first aligning portion 81 and the second aligning portion 82 moves from non-contact positions (indicated by the two-dot chain lines in FIG. 16), at which the first aligning portion 81 and the second aligning portion 82 are not in contact with the recording medium P loaded on the loading surface 22, and comes into contact with each of the side ends (specifically, the front end P3 and the rear end P4) of the recording medium P. The non-contact position is also a position at which each of the first aligning portion 81 and the second aligning portion 82 is separated from the transport path of the recording medium P transported to the loading surface 22. In addition, the aligning section 80 returns to the non-contact position after aligning the side ends of the recording medium P. In the present exemplary embodiment, each time the transporting rollers 39 transport the recording medium P to the loading surface 22, the above-mentioned abutting operation performed by the abutting section 75, and the above-mentioned alignment performed by the aligning section 80 are executed. Thereby, the plurality of recording media P are loaded on the loading surface 22 in a state of being aligned in the up-down direction and the front-rear direction.

Post-Processing Section 90

The post-processing section 90 shown in FIG. 1 is a constituent section that executes the post-processing on the recording medium P loaded on the loading surface 22. In the present exemplary embodiment, the post-processing section 90 executes, as the post-processing, processing of binding the plurality of recording media P and folding the plurality of recording media P.

As shown in FIG. 1, the post-processing section 90 includes a binding portion 91, a pair of folding rollers 92 and 93, a push-in portion 94, and transporting rollers 96. The binding portion 91 is a so-called stapler, and the plurality of recording media P are bound by striking a needle at central portions of the plurality of recording media P loaded on the loading surface 22 in the up-down direction.

The pair of folding rollers 92 and 93 are disposed side by side along the obliquely upper right side on the obliquely lower right side with respect to the passage hole 44 of the guiding section 40. The folding roller 92 rotates in the clockwise direction in FIGS. 17 and 18, and the folding roller 93 rotates in the counterclockwise direction in FIGS. 17 and 18.

The push-in portion 94 is formed in a tapered shape of which a length is longer than the length of the recording medium P loaded on the loading surface 22 in the front-rear direction and of which the apical end portion is tapered.

Figure 17:
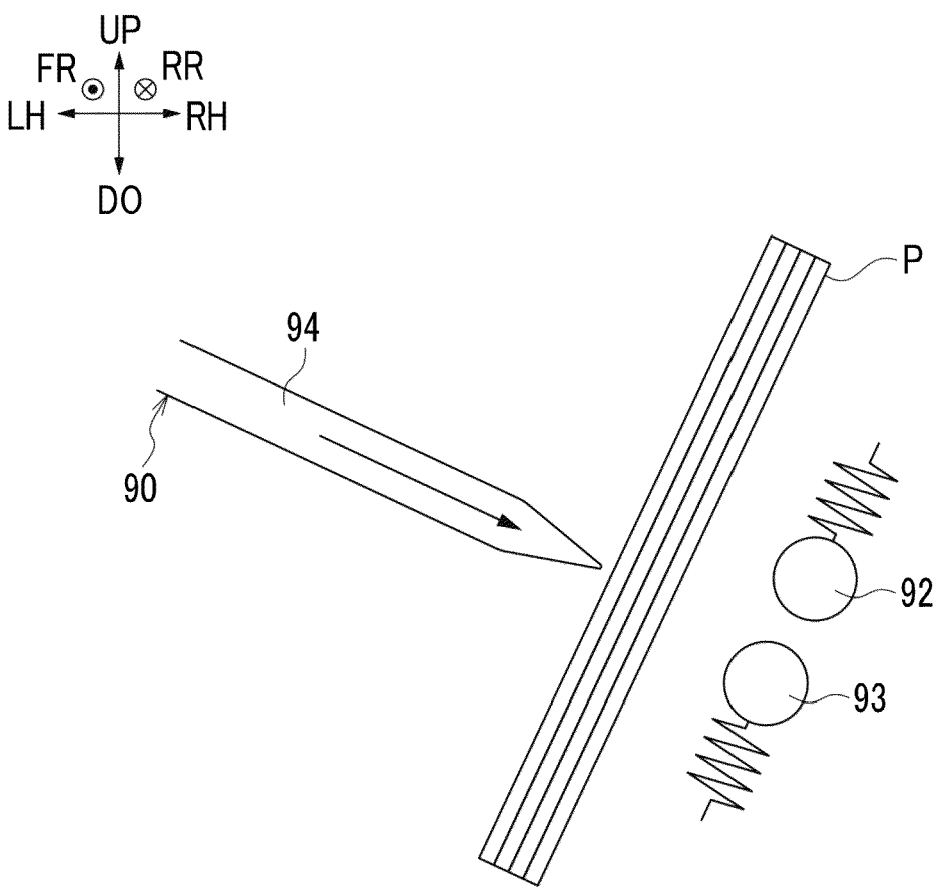
FIG. 17 is a schematic diagram showing a state before executing of folding processing in the post-processing section according to the present exemplary embodiment.
Figure 18:
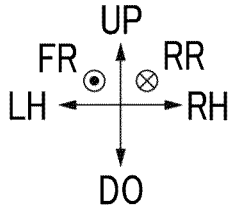
FIG. 18 is a schematic diagram showing a state where folding processing is executed in the post-processing section according to the present exemplary embodiment.
Figure 18:
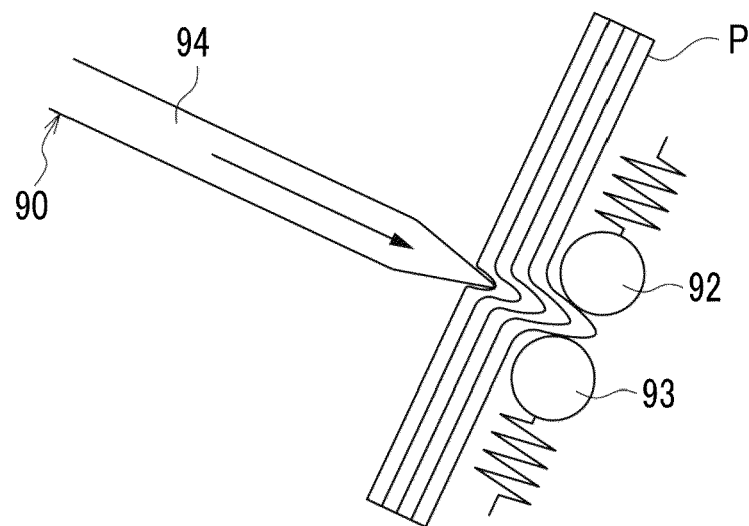

As shown in FIGS. 17 and 18, the push-in portion 94 moves toward the obliquely lower right side in a direction orthogonal to the loading surface 22, pushes the apical end portion thereof into a central portion in the up-down direction which is a fold part in the plurality of recording media P loaded on the loading surface 22, and pushes the central portion into a gap between the pair of folding rollers 92 and 93, thereby sandwiching the plurality of recording media P between the pair of folding rollers 92 and 93 and folding the plurality of recording media P.

By rotating the pair of folding rollers 92 and 93, the folded recording medium P is transported to the transporting rollers 96. Further, the transporting rollers 96 transports the plurality of recording media P folded by the pair of folding rollers 92 and 93 and the push-in portion 94, and ejects the recording medium P to the ejection section (not shown in the drawing).

The post-processing executed by the post-processing section 90 is not limited to the above-mentioned processing. As the post-processing, for example, only one of binding processing of binding the plurality of recording media P and folding processing of folding the plurality of recording media P may be performed. Further, the post-processing may be cutting processing of cutting the recording medium P, drilling processing of making a hole in the recording medium P, or the like, and may be processing executed on the recording medium P on which an image is formed.

Action of Present Exemplary Embodiment

In the present exemplary embodiment, the transporting mechanism 30 transports a plurality of recording media P toward the loading section 20 by shifting and stacking the recording media P transported one by one from the image forming section 102 in a transport direction (refer to FIGS. 2 to 10), and sets an amount of shift of the recording media P on the basis of a predetermined condition.

Here, the required amount of shift differs depending on conditions such as the image density and the basis weight of the recording medium P. Therefore, in a case where the amount of shift of the recording medium P in the transporting mechanism 30 in the post-processing device 10 is consistently constant (hereinafter, referred to as a form A), in the transporting rollers 39, trouble in separation of the recording medium P may occur, and variation in posture of the loaded recording medium P may occur.

In contrast, in the present exemplary embodiment, as described above, the transporting mechanism 30 shifts the recording media P transported one by one from the image forming section 102 in the transport direction, stacks the plurality of the recording media P, and transports the recording media P toward the loading section 20 (refer to FIGS. 2 to 10). Since the amount of shift of the recording media P is set on the basis of the predetermined condition, variation in posture of the loaded recording medium P is suppressed, as compared with the form A.

Further, in the present exemplary embodiment, the predetermined condition is an image density formed on the recording medium P. Here, the friction coefficient of the recording media P with the transporting rollers 39 is able to change between the formation part in which an image is formed and the non-formation part in which an image is not formed. Therefore, the recording media P have different required amounts of shift depending on the image densities of the recording media P.

Further, in the present exemplary embodiment, as described above, the predetermined condition is the image density formed on the recording medium P. Therefore, as compared with a case where the predetermined condition is only the basis weight of the recording medium P, variation in posture of the loaded recording medium P is suppressed.

Further, in the present exemplary embodiment, the transporting mechanism 30 sets the amount of shift of the recording medium P as the first amount (for example, 5 mm) in a case where the image density of the recording medium P is the first density, and sets the amount of shift of the recording medium P as a second amount (for example, 10 mm) greater than the first amount in a case where the image density of the recording medium P is a second density higher than the first density.

Here, the formation part in which the image is formed may have a lower friction coefficient thereof with the transporting rollers 39 than the non-formation part in which the image is not formed. In addition, slippage may tend to occur between the transporting rollers 39 and the recording medium P. In such a case, in a case where the image density of the recording medium P is high, the required amount of shift is large.

Further, in the present exemplary embodiment, in a case where the image density of the recording medium P is a second density higher than the first density, the amount of shift of the recording medium P is set to a second amount (for example, 10 mm) greater than the first amount. Therefore, variation in posture of the loaded recording medium P of which the image density is the second density is suppressed, as compared with a case where the amount of shift is consistently the first amount.

Modification Example of Transporting Mechanism
30

In the present exemplary embodiment, a predetermined condition in which the transporting mechanism 30 sets the amount of shift of the recording medium P is the image density formed on the recording medium P. However, the present invention is not limited thereto. For example, the predetermined condition may be set as the basis weight of the recording medium P.

Here, the degree of bending deformation of the recording medium P changes depending on the basis weight, and thus the path in the case of entering the transporting rollers 39, the behavior in the case of being transported to the transporting rollers 39, and the like change. Therefore, the required amount of shift differs depending on the basis weight of the recording medium P.

Further, in the present modification example, as described above, the predetermined condition is the basis weight of the recording medium P. Therefore, as compared with the case where the predetermined condition is only the image density of the recording medium P, variation in posture of the loaded recording medium P is suppressed.

Further, in the present modification example, the transporting mechanism 30 sets the amount of shift of the recording medium P as the first amount (for example, 5 mm) in a case where the basis weight of the recording medium P is the first basis weight, and sets the amount of shift of the recording medium P as a second amount (for example, 10 mm) greater than the first amount in a case where the basis weight of the recording medium P is a second basis weight greater than the first basis weight.

Here, the basis weight of the recording medium P is large, and a degree of bending deformation is small. Therefore, for example, the gap between transporting rollers 39 and the recording medium P may be likely to be narrow, due to the path in a case of entering the transporting rollers 39 and the behavior in a case of being transported to the transporting rollers 39. In such a case, in a case where the basis weight of the recording medium P is large, the required amount of shift is large.

Further, in the present modification example, in a case where the basis weight of the recording medium P is a second basis weight greater than the first basis weight, the amount of shift of the recording medium P is set to a second amount (for example, 10 mm) greater than the first amount. Therefore, variation in posture of the loaded recording medium P of which the basis weight is the second basis weight is suppressed, as compared with a case where the amount of shift is consistently the first amount.

Further, as the predetermined condition for the transporting mechanism 30 to set the amount of shift of the recording medium P, for example, the size of the recording medium P (specifically, at least one of the dimension of the recording medium P in the transport direction or the dimension of the recording medium P in the width direction intersecting the transport direction) may be used.

Other Modification Examples

In the present exemplary embodiment, the transporting rollers 39 are used as an example of the transporting section. However, the present invention is not limited thereto. As the example of the transporting section, for example, a transport belt, a transport drum, or the like may be used, and any constituent section that is able to transport the recording medium P may be used.

The present invention is not limited to the above-mentioned exemplary embodiment, and various modifications, changes, and improvements can be made without departing from the scope of the present invention. For example, the above-mentioned modification examples may be configured to be combined with each other as appropriate.

Supplementary Notes (((1)))

A post-processing device comprising:

a loading section that has a loading surface directed obliquely upward and in which a recording medium is loaded on the loading surface in a state where one end of the recording medium is directed downward;

a supporting section that supports the one end of the recording medium loaded on the loading surface;

a transporting mechanism that transports a plurality of recording media transported one by one toward the loading section by shifting and stacking the recording media in a transport direction, and sets an amount of shift of the recording media on the basis of a predetermined condition; and a transporting section that bends each of the plurality of recording media transported from the transporting mechanism by applying a transport force to an upper end of each of the recording media opposite to the one end in a state where the one end is in contact with the supporting section, and separates one by one the recording media and loads the recording media on the loading surface.

(((2)))

The post-processing device according to (((1))), wherein the predetermined condition is a density of an image formed on the recording medium.

(((3)))

The post-processing device according to (((2))), wherein the transporting mechanism sets the amount of shift as a first amount in a case where the density of the image is a first density, and sets the amount of shift as a second amount greater than the first amount in a case where the density of the image is a second density higher than the first density.

(((4)))

The post-processing device according to (((1))), wherein the predetermined condition is a basis weight of the recording medium.

(((5)))

The post-processing device according to (((4))), wherein the transporting mechanism sets the amount of shift as a first amount in a case where the basis weight is a first basis weight, and sets the amount of shift as a second amount greater than the first amount in a case where the basis weight is a second basis weight greater than the first basis weight.

(((6)))

An image forming apparatus comprising:

an image forming section that forms an image on a recording medium; and the post-processing device according to any one of (((1))) to (((5))) that executes post-processing on the recording medium on which the image forming section forms the image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A post-processing device comprising:

a loading section that has a loading surface directed obliquely upward and in which a recording medium is loaded on the loading surface in a state where one end of the recording medium is directed downward;

a supporting section that supports the one end of the recording medium loaded on the loading surface;

a transporting mechanism that transports a plurality of recording media transported one by one toward the loading section by shifting and stacking the recording media in a transport direction, and sets an amount of shift of the recording media on the basis of a predetermined condition; and a transporting section that bends each of the plurality of recording media transported from the transporting mechanism by applying a transport force to an upper end of each of the recording media opposite to the one end in a state where the one end is in contact with the supporting section, and separates one by one the recording media and loads the recording media on the loading surface.

2. The post-processing device according to claim 1, wherein the predetermined condition is a density of an image formed on the recording medium.

3. The post-processing device according to claim 2, wherein the transporting mechanism sets the amount of shift as a first amount in a case where the density of the image is a first density, and sets the amount of shift as a second amount greater than the first amount in a case where the density of the image is a second density higher than the first density.

4. The post-processing device according to claim 1, wherein the predetermined condition is a basis weight of the recording medium.

5. The post-processing device according to claim 4, wherein the transporting mechanism sets the amount of shift as a first amount in a case where the basis weight is a first basis weight, and sets the amount of shift as a second amount greater than the first amount in a case where the basis weight is a second basis weight greater than the first basis weight.

6. An image forming apparatus comprising:

an image forming section that forms an image on a recording medium; and the post-processing device according to claim 1 that executes post-processing on the recording medium on which the image forming section forms the image.

7. An image forming apparatus comprising:

an image forming section that forms an image on a recording medium; and the post-processing device according to claim 2 that executes post-processing on the recording medium on which the image forming section forms the image.

8. An image forming apparatus comprising:

an image forming section that forms an image on a recording medium; and the post-processing device according to claim 3 that executes post-processing on the recording medium on which the image forming section forms the image.

9. An image forming apparatus comprising:

an image forming section that forms an image on a recording medium; and the post-processing device according to claim 4 that executes post-processing on the recording medium on which the image forming section forms the image.

10. An image forming apparatus comprising:

an image forming section that forms an image on a recording medium; and the post-processing device according to claim 5 that executes post-processing on the recording medium on which the image forming section forms the image.

* * * * *